Aug. 11, 1931.  H. PARKER  1,818,922

MULTIPLE CONDUIT

Original Filed March 9, 1928

Inventor:
Howard Parker:
By
Wright Brown Quinby May
Attys.

Patented Aug. 11, 1931

1,818,922

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MULTIPLE CONDUIT

Original application filed March 9, 1928, Serial No. 260,452. Divided and this application filed July 2, 1929. Serial No. 375,427.

This invention relates to multiple conduit sections which may be built up in units by securing two or more sections of single conduit in spaced side-by-side relation, the multiple sections being adapted to be laid end to end, the corresponding conduit ends being joined together to form a continuous multiple conduit of any desired length. This application is divided from my copending application Serial No. 260,452 filed March 9, 1928. For many purposes, a fabricated conduit of waterproofed fiber is found desirable by reason of its comparative toughness, strength, durability, lightness and low price. A particularly desirable kind of conduit of the waterproofed fiber type is made by winding a sheet of wet pulp upon itself under pressure in convolutions until the desired wall thickness is obtained, drying out the moisture, and saturating the dry tube with asphaltic or other waterproofing material. Sections of such conduit may be assembled and secured together to form sections of multiple conduit by the use of suitable spacers and means for holding the structure together. The sections of single or multiple conduit may be laid end to end and united by suitable couplings to form continuous conduits of indeterminate length suitable for use as pipe-lines or for telephone or electric power cables or for any other uses to which conduits are put. In some cases, it is preferred to use the conduits as cores about which concrete or other filling may be poured and set, the fiber conduits remaining in the structure to line the bores which they form in the filler. In building up sections of multiple conduit for use as cores in concrete construction or the like, there are several factors to be considered, depending to some extent on the eventual use for which the conduit is intended. As one of the chief uses of this type of conduit is at present to hold telephone cables or electric power transmission cables, it is essential that no metal fasteners be driven into the material of the conduit. It is desirable that the spacers between the individual sections making up the multiple section be of a durable material, preferably adapted to bond with the concrete or other material to be used in filling in the spaces between the individual conduits after they are placed in position. It is also desirable that the spacers be constructed so that the axes of the individual conduit sections will be spaced from one another with the greatest possible uniformity so as to minimize the possibility of difficulty in fitting together the several abutting ends of conduits in successive sections.

With these desiderata in view, multiple conduit sections are provided according to the present invention, which comprise spacing elements of cement or an equivalent which bond with concrete filling which may be used to surround the conduits when laid, and which thus result in a final uninterrupted casing of concrete or cement about each individual conduit. This is particularly desirable when the conduit is to be used for electric power cables since in case of overload and fusing of the cable in one conduit, the trouble is confined to that one conduit by the concrete, and cannot extend to adjacent conduits.

According to the invention, a simple multiple conduit is provided which is not only light and strong, but which is also well adapted to be shipped in knocked-down form and assembled on the field. The latter feature makes possible a great saving of shipping space when an order is delivered from the mill to a location for installation.

Various advantageous features of the invention will be apparent to one skilled in the art from the following description and from the drawings, of which,—

Figure 1:
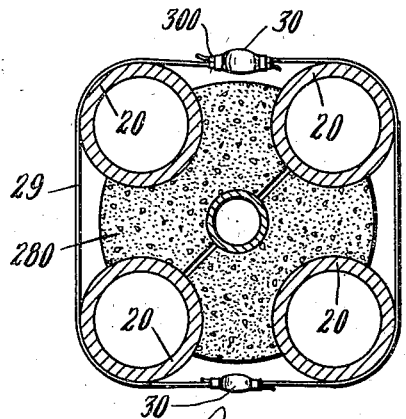
Figure 1 is a transverse section of a multiple conduit embodying the invention.
Figure 2:
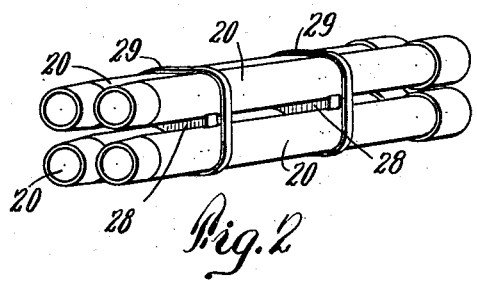
Figure 2 is a perspective view of a multiple conduit of the same type.
Figure 4:
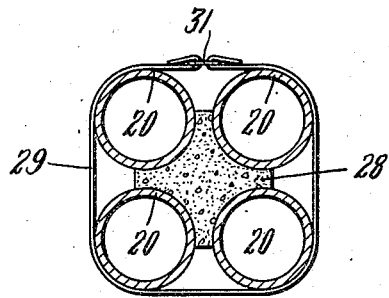
Figure 5:
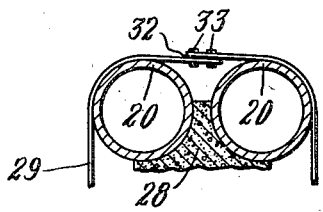
Figure 5 is a fragmentary section showing a modification of the fastening element for the tie members.
Figure 6:
Figure 6 is a perspective view of a spacing element.

Referring to the drawings in detail, a section of multiple conduit embodying the invention may comprise a number of sections 20 of individual conduit arranged parallel to one another and spaced uniformly by a series of unitary spacing elements 28 or split elements 280. These elements are preferably of concrete or similar durable non-conducting material. With this type of spacer, there is no means attached thereto for holding the conduit sections 20 in position. Tie members 29 may therefore be provided to extend around the group of conduit sections as shown in Figure 2 at spaced intervals and to hold them together in their proper places. The tie members 29 may be of any suitable material. Steel ribbon is convenient for this purpose since it is readily drawn tight and crimped and clipped as at 30 or otherwise fastened together by suitable means known to the art. If it is desired to avoid a complete metal circuit around the multiple conduit which in some cases is considered objectionable, as when the conduits are used to hold electric cables, the metallic loop about the conduit formed by the tie member 29 may be interrupted by insulating the end portions of the band with rubber, tape, or the like, as at 300 before they are pinched together with a clip. This may be done by coating each end portion of metal strips of suitable length with unvulcanized rubber, then vulcanizing the rubber on the strip, or sheaths of rubber or other suitable insulating material may be slipped over the ends of each strip, or the ends may be taped. The metal loop of the tie member may also be interrupted by the use of a block 31 of fiber or other non-conducting material to hold the ends of the tie member 29 as shown in Figure 4. Another method of breaking the metallic circuit is illustrated in Figure 5, an insulating pad 32 being used between the end portions of the band 29, the ends being joined by fasteners 33 which may be insulated from the band 29 by suitable bushings. In order to avoid difficulties which may be experienced in drawing a band 29 taut in connection with making an insulated joint between its end portions, a couple of pieces of band may be joined with insulation between the ends, then the single jointed band thus formed may be passed around the multiple conduit section and its free ends may be drawn taut and clipped as shown in Figure 1. This obviates the possibility of the stretching or clipping tools marring the insulation at the insulated joint when the band is applied to a multiple conduit section. This type of multiple conduit has the advantage of being readily assembled with little difficulty by the use of simple portable tools. It thus lends itself to economy in transportation charges since the multiple conduit may be shipped in comparatively compact knockdown form, the constituent members being assembled on the field prior to the installation of multiple conduit on the job. If desired, the conduit such as is illustrated in Figure 2 may be laid on the job and encased in concrete up to the upper surface thereof. After the concrete has partially set, the tie members 29 may be cut and pulled out of the concrete, leaving no metallic members embedded therein.

Figure 3:
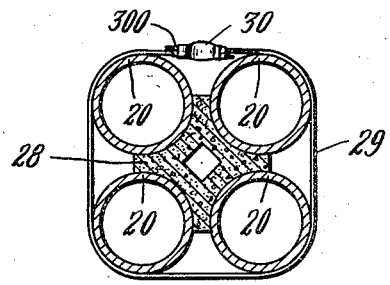
Figures 3 and 4 are transverse sections of multiple conduits showing slight modifications.

In assembling multiple conduit of the kind illustrated in Figure 2, the spacing and holding members are preferably arranged at suitable intervals to give sufficient strength to the structure as a whole. One of the spacing elements is preferably located closely adjacent to one end of the multiple section, the spacing element most remote therefrom being spaced from the further end of the section by a sufficient distance to permit a slight lateral bending of the individual conduit ends in order to facilitate the interengagement of these ends with the corresponding ends of the next adjacent section of multiple conduit as laid. The spacer element 28 may be made if desired with a central aperture, as shown in Figures 1 and 3, to reduce shipping weight and to increase the direct longitudinal bonding of the concrete which may be poured around the conduits after they are installed in a trench or form.

The spacers may be split as in Figure 1, the central aperture being used to hold a central conduit which may be of smaller size than the outer conduits. In a multiple conduit for electric power cables a smaller conduit for signal wires is often convenient. By reason of the pressure of the tie members on the split sections 280 of the spacer blocks through the conduits 20, the central conduit is clamped tightly in place.

It is to be understood that the invention is not to be limited to the particular embodiments described, but that it may include various modifications and changes within the scope of the appended claims.

I claim:

1. As an article of manufacture, a multiple conduit comprising a plurality of individual conduit sections, a cement spacer member engaging said individual sections, and a narrow metal band looped around outside of the group of conduits and holding them against said spacer.

2. As an article of manufacture, a multiple conduit section comprising a plurality of individual sections in side-by-side relation, a spacer engaging said individual sections, a narrow metal band looped around outside of the group of conduits and holding them against said spacer, and insulating material interrupting the metal circuit of said loop.

3. As an article of manufacture, a multiple conduit section comprising a group of individual waterproofed fiber conduit sections, cement spacing blocks engaging each of the individual sections, narrow metal bands looped around the group holding said individual sections against said blocks, and insulating material interrupting the metal circuits of said loops.

4. As an article of manufacture, a multiple conduit section comprising a plurality of individual sections in side-by-side relation, a spacer engaging said individual sections, and a narrow metal band looped around outside of the group of sections and holding them against said spacer, said band having a break between the ends thereof with insulating material between the portions on either side of the break, the end of the band being drawn taut and secured.

5. As an article of manufacture, a multiple conduit section comprising a plurality of individual sections in side-by-side relation, a spacer engaging said individual sections, and a metal band looped around outside of the group of sections and holding them against said spacer, said band comprising a pair of segments, the end portions of one segment being overlapped by and clipped to the end portions of the other segment, one pair of overlapping end portions each having a coating of insulating material thereon.

6. As an article of manufacture, a multiple conduit comprising a plurality of individual conduit sections, a two-piece spacer element having peripheral indentations to receive individual conduit sections, said spacer also having a transverse split separating the two pieces thereof and including a central aperture to receive a conduit section therein, and a flexible tie member extending around the group of conduit sections and holding them in their respective indentations, said tie member also acting to draw said two pieces of the spacer together to clamp the central conduit section between them, said tie member having connected end portions with insulating material thereon whereby metallic contact between said end portions is prevented.

7. As an article of manufacture, a multiple conduit comprising a plurality of individual conduit sections, a cement spacer member engaging said individual sections, and a narrow metal band looped around outside of said groups of conduits substantially in the plane of said spacer.

8. As an article of manufacture, a multiple conduit comprising a plurality of individual conduit sections, a plurality of cement spacers spaced longitudinally along said conduit, each said spacer engaging all of said individual sections, and a narrow metal band looped around outside of said group substantially in the plane of each said spacer.

In testimony whereof I have affixed my signature.

HOWARD PARKER.